(12) United States Patent
Hirabayashi et al.

(10) Patent No.: US 12,359,718 B2
(45) Date of Patent: Jul. 15, 2025

(54) CONTROL DEVICE AND CONTROL METHOD

(71) Applicant: TOYOTA JIDOSHA KABUSHIKI KAISHA, Toyota (JP)

(72) Inventors: Hidekazu Hirabayashi, Chiryu (JP); Takayuki Shimauchi, Toyota (JP); Yuta Saito, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 122 days.

(21) Appl. No.: 18/456,598

(22) Filed: Aug. 28, 2023

(65) Prior Publication Data

US 2024/0263697 A1    Aug. 8, 2024

(30) Foreign Application Priority Data

Feb. 6, 2023    (JP) ................. 2023-016170

(51) Int. Cl.
| | |
|---|---|
| *F16H 61/16* | (2006.01) |
| *B60R 15/04* | (2006.01) |
| *B60R 21/00* | (2006.01) |
| *B60R 21/01* | (2006.01) |
| *B60R 21/015* | (2006.01) |
| *F16H 59/50* | (2006.01) |

(52) U.S. Cl.
CPC ............. *F16H 61/16* (2013.01); *B60R 15/04* (2013.01); *F16H 59/50* (2013.01); *B60R 2021/0069* (2013.01); *B60R 2021/01259* (2013.01); *B60R 21/0153* (2014.10)

(58) Field of Classification Search
CPC ......... F16H 61/16; F16H 59/50; B60R 15/04; B60R 21/0153; B60R 2021/0069; B60R 2021/01259; B60W 30/19; B60W 30/02; B60W 50/0098
See application file for complete search history.

(56) References Cited

U.S. PATENT DOCUMENTS

| | | | |
|---|---|---|---|
| 2013/0184979 A1* | 7/2013 | Karandikar | G08G 1/168 |
| | | | 701/301 |
| 2022/0001814 A1 | 1/2022 | Arahama et al. | |
| 2022/0006319 A1 | 1/2022 | Arahama et al. | |
| 2022/0044573 A1* | 2/2022 | Luo | B60W 40/105 |
| 2022/0299638 A1* | 9/2022 | Beckman | G01V 8/14 |
| 2024/0001851 A1* | 1/2024 | Burbank | G06V 20/59 |

FOREIGN PATENT DOCUMENTS

| | | |
|---|---|---|
| JP | 2022013201 A | 1/2022 |
| JP | 2022013202 A | 1/2022 |
| WO | 2021210616 A1 | 10/2021 |

* cited by examiner

*Primary Examiner* — Quan Zhen Wang
*Assistant Examiner* — Rajsheed O Black-Childress
(74) *Attorney, Agent, or Firm* — Dickinson Wright, PLLC

(57) ABSTRACT

The control device controls a vehicle towing a trailer. The control device is configured to determine whether or not a user is present in the trailer when a shift range is in the parking range. The control device is configured to ignore a shift range switching operation by a driver when the shift range switching operation is performed while a user is present in the trailer.

3 Claims, 2 Drawing Sheets

CONTROL DEVICE AND CONTROL METHOD

TECHNICAL FIELD

This invention relates to a control device and a control method.

BACKGROUND ART

Conventionally, a trailer with a toilet room is known (see, for example, Patent Literature 1). The trailer is configured to be towed by a vehicle.

PRIOR ART LITERATURE

Patent Literature

[Patent Literature 1] JP2022-13201A

SUMMARY OF INVENTION

Problem to Be Solved by Invention

Here, if the towing of the trailer by a vehicle is started when the trailer is being used by a person, the trailer will move unexpectedly for the person in the trailer, which is undesirable for safety.

The present invention was made to solve the above problem, and the object of the invention is to provide a control device and a control method that can improve safety when a person is in the trailer.

Means for Solving Problem

A control device according to the present invention controls a vehicle towing a trailer. The control device is configured to determine whether or not a person is present in the trailer when a shift range is in a parking range. The control device is configured to ignore a shift range switching operation by a driver when the shift range switching operation is performed while a person is present in the trailer.

By this configuration, even if the shift range switching operation is performed by the driver when a person is present in the trailer, it is disabled and the shift range is kept in the parking range. This prevents the trailer from being moved when the trailer is being used by a person.

The above control device may be configured to inform the driver of the presence of a person in the trailer by means of an informing device when the switching operation is ignored.

In the above control device, the trailer may be provided with a toilet room and a detection unit for detecting the presence or absence of a person in the toilet room. The control device may be configured to acquire a detection result of the detection unit.

A control method according to the present invention controls a vehicle towing a trailer, and includes the steps of determining whether or not a person is present in the trailer when a shift range is in a parking range, and ignoring a shift range switching operation by a driver when the shift range switching operation is performed while a person is present in the trailer.

Advantageous Effects of Invention

According to the control device and control method of the present invention, safety can be improved when a person is present in the trailer.

DESCRIPTION OF EMBODIMENTS

One embodiment of the invention is described below.

First, the configuration of a vehicle system 100 according to one embodiment of the invention will be described.

Figure 1:
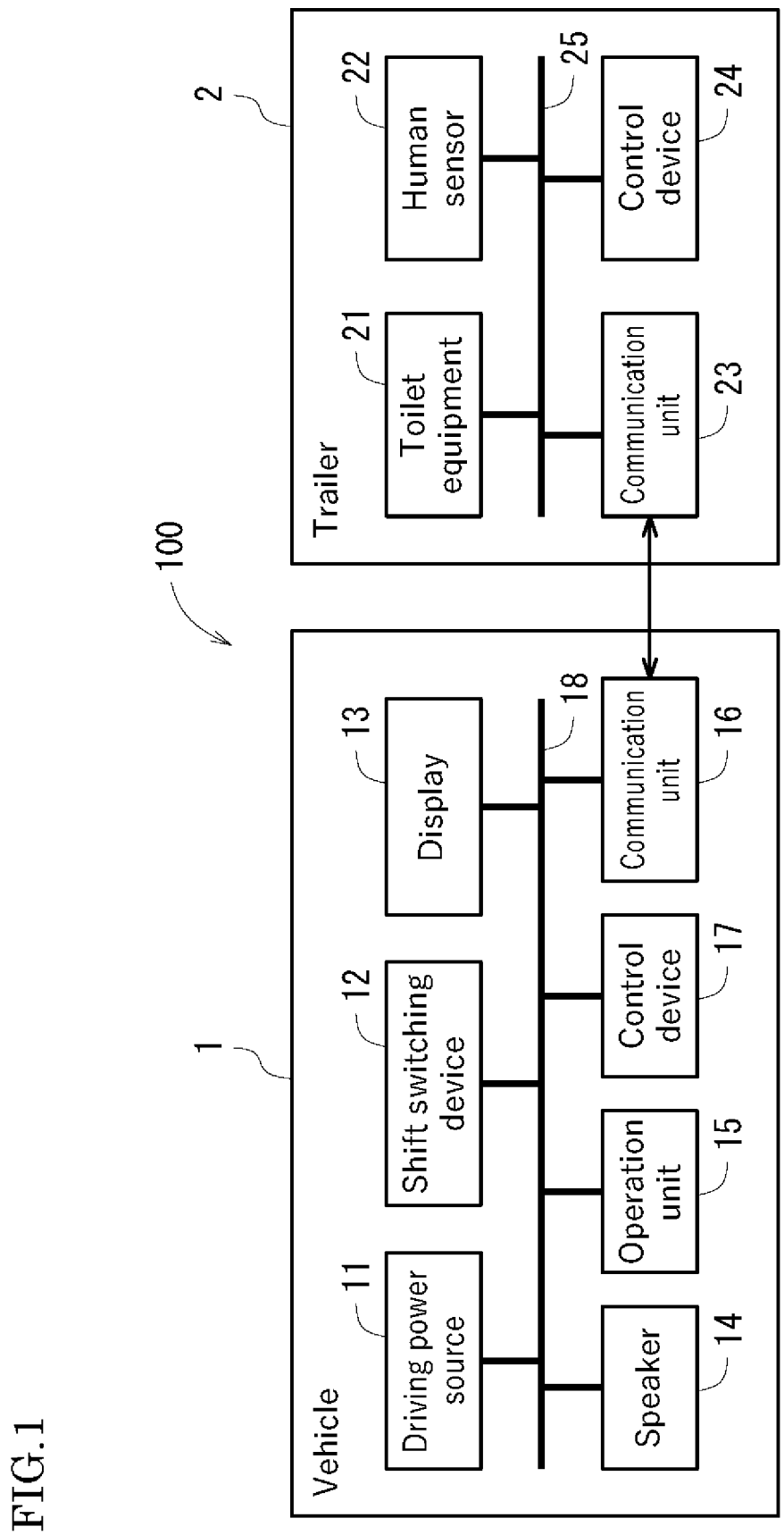
FIG. 1 is a block diagram of a vehicle system of this embodiment.

As shown in FIG. 1, the vehicle system 100 has a vehicle 1 and a trailer 2. The vehicle 1 is configured to tow the trailer 2. The trailer 2 is equipped with a toilet room. The vehicle system 100 is thus configured to allow the toilet room to be mobile. When the toilet room is used by a user, the vehicle 1 and the trailer 2 are parked. The user is an example of a "person" of the present invention.

The vehicle 1 includes a driving power source 11, a shift switching device 12, a display 13, a speaker 14, an operation unit 15, a communication unit 16, and a control device 17. The driving power source 11, shift switching device 12, display 13, speaker 14, operation unit 15, communication unit 16, and control device 17 are connected via a network 18.

The driving power source 11 is configured to output power for vehicle travel. For example, the driving power source 11 may be an internal combustion engine or a motor. The shift switching device 12 is provided for switching the shift range of the vehicle 1. For example, drive range, reverse range, neutral range, and parking range are set as shift ranges.

The drive range is for forward traveling, and the wheels are rotated forward by power from the driving power source 11. The reverse range is for backward traveling, and the wheels are rotated backward by power from the driving power source 11. The neutral range is for neutral, and the power transmission system between the driving power source 11 and the wheels is shut off. The parking range is for parking, and the power transmission system between the driving power source 11 and the wheels is locked.

The display 13 is configured to display various information and inform the driver of such information. The speaker 14 is configured to output various information audibly and inform the driver of such information. The display 13 and the speaker 14 are examples of the "informing device" of the present invention.

The operation unit 15 is provided to accept a shift range switching operation by the driver. In other words, the operation unit 15 is configured to enable input of a shift range switching instruction by the driver. The operation unit 15 outputs signals to the control device 17 in response to the accepted switching operation. For example, the operation unit 15 may be a lever or a switch. The communication unit 16 is provided for communicating with the trailer 2.

The control device 17 is configured to control the vehicle 1. Specifically, the control device 17 includes an arithmetic unit and a memory unit. The vehicle 1 is controlled by a program stored in the memory unit is executed by the arithmetic unit. The control device 17 is also configured to control the shift switching device 12 based on the input from the operation unit 15. For example, when the operation to switch to the parking range is accepted by the operation unit 15, the control device 17 controls the shift switching device 12 to switch the shift range to the parking range. In other words, the shift range can be changed by the driver operating the operation unit 15.

The trailer 2 includes a toilet equipment 21, a human sensor 22, a communication unit 23, and a control device 24. The toilet equipment 21, the human sensor 22, the communication unit 23, and the control device 24 are connected via a network 25.

The toilet equipment 21 is installed in a toilet room and has a toilet bowl and a toilet bowl washing unit. The human sensor 22 is provided to detect the presence or absence of a user in the toilet room. The human sensor 22 is an example of a "detection unit" of the present invention. The communication unit 23 is provided for communicating with the vehicle 1. The communication units 16 and 23 may be connected wirelessly or wired.

The control device 24 is configured to control the trailer 2. Specifically, the control device 24 includes an arithmetic unit and a memory unit. The trailer 2 is controlled by a program stored in the memory unit is executed by the arithmetic unit. The control device 24 is also configured to transmit the detection result of the human sensor 22 to the vehicle 1 from the communication unit 23.

In this embodiment, the control device 17 of the vehicle 1 is configured to control the shift switching device 12 based on inputs from the operation unit 15 and the communication unit 16. Specifically, when the shift range is in the parking range, the control device 17 is configured to determine whether or not a user is present in the toilet room. Then, the control device 17 is configured to ignore the shift range switching operation if the shift range is switched by the driver when there is a user in the toilet room. As a result, when a user is in the toilet room, even if the shift range is switched by the driver, it is disabled and the shift range is kept in the parking range. When the switching operation is ignored, the control device 17 is also configured to inform the driver of the presence of a user in the toilet room, using the display 13 and the speaker 14.

—Operation when the Shift Range Switching Operation is Disabled—

Figure 2:
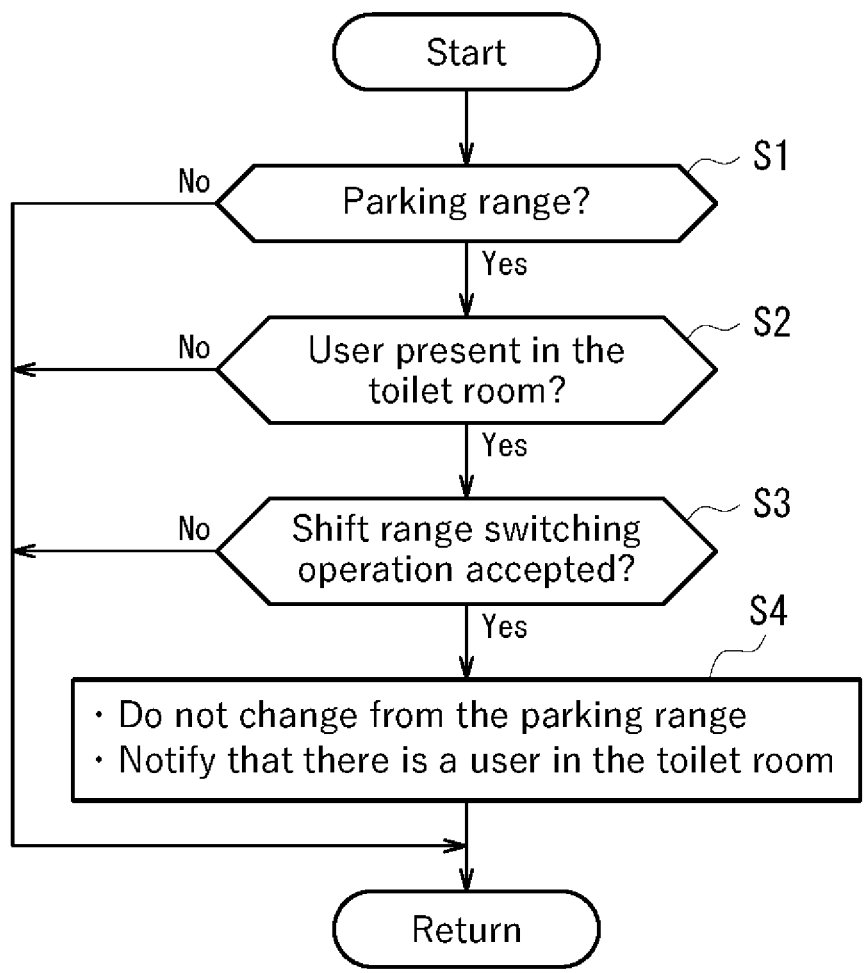
FIG. 2 is a flowchart for explaining the operation when the shift range switching operation is disabled in the vehicle system of this embodiment.

Referring now to FIG. 2, the operation when the shift range switching operation is disabled in the vehicle system 100 will be described. The flowchart shown in FIG. 2 is repeated at predetermined time intervals.

First, in step S1, the current shift range is determined by the control device 17. The current shift range is known by the control device 17. If the control device 17 determines that the current shift range is the parking range, the process moves to step S2. On the other hand, if the control device 17 determines that the current shift range is not the parking range, the process moves to return. That is, if the current shift range is the drive range, reverse range, or neutral range, the process moves to return.

Next, in step S2, the control device 17 determines whether or not a user is present in the toilet room. For example, the control device 17 requests the detection result of the human sensor 22 from the trailer 2. In response to that request, the trailer 2 transmits the detection result of the human sensor 22 to the vehicle 1. Therefore, the control device 17 obtains the detection result of the human sensor 22 via the communication unit 16. Based on the detection result of the human sensor 22, the control device 17 determines whether or not there is a user in the toilet room. If the control device 17 determines that there is a user in the toilet room, the process moves to step S3. On the other hand, if the control device 17 determines that there is no user in the toilet room, the process moves to return.

Next, in step S3, the control device 17 determines whether or not the shift range is switched by the driver. Specifically, when the shift range switching operation by the driver is accepted by the operation unit 15, a signal corresponding to the switching operation is output from the operation unit 15 and input to the control device 17. The control device 17 judges that the shift range switching operation has been performed when the signal corresponding to the switching operation is input. If the control device 17 determines that the shift range switching operation by the driver has been performed, the process moves to step S4. In other words, if the driver operates the shift to the drive range, reverse range or neutral range, the process moves to step S4. On the other hand, if the control device 17 determines that the driver has not performed the shift range switching operation, the process moves to return.

Next, in step S4, the shift range switching operation by the driver is ignored by the control device 17 and the shift range is kept in the parking range. In other words, the driver's shift range switching operation is canceled and the shift range is not changed from the parking range. The control device 17 also informs the driver of the presence of the user in the toilet room, using the display 13 and the speaker 14.

-Effect-

In this embodiment, as described above, if a shift range switching operation from the parking range is performed when a user is in the toilet room, the shift range switching operation is ignored. By this configuration, even if the shift range switching operation is performed by the driver when a user is in the toilet room, it is ignored and the shift range is kept in the parking range. This prevents the trailer 2 from being moved when the toilet room is being used by the user. Thus, safety can be improved when a user is in the toilet room.

If the shift range is switched when there is no user in the toilet room, the shift range is switched. For example, if the shift range is switched to the drive range, the trailer 2 can be towed by the vehicle 1.

In this embodiment, when the shift range switching operation is ignored, the presence of the user in the toilet room is reported to the driver by the display 13 and the speaker 14. This configuration allows the driver to understand the cause of the shift range switching operation being canceled.

-Other Embodiments-

The embodiment disclosed here is an example in all respects, and is not intended to be a basis for limiting interpretation. Therefore, the technical scope of the invention is not to be interpreted solely by the embodiment described above, but is to be defined based on the claims. The technical scope of the invention also includes all modifications within the meaning and scope equivalent to the claims.

For example, the above embodiment shows an example in which a toilet room is provided in the trailer 2. Not limited to this, the trailer may be provided with a bathroom or the like.

In the above embodiment, an example was shown in which the presence or absence of a user in the toilet room is determined based on the detection result of the human sensor 22. Not limited to this, the presence or absence of a user in the toilet room may be determined based on the detection result of the key sensor of the toilet room door. The presence or absence of a user in the toilet room may also be determined based on the detection result of the toilet seat sensor.

The above embodiment shows an example in which the display 13 and the speaker 14 are provided to inform the driver that a user is in the toilet room. Not limited to this, the display to inform the driver that a user is in the toilet room may not be provided. Also, the speaker to inform the driver that a user is in the toilet room may not be provided.

INDUSTRIAL APPLICABILITY

The present invention is applicable to a control device and a control method for controlling a vehicle towing a trailer.

What is claimed is:

1. A control device for controlling a vehicle towing a trailer, wherein
    the control device is configured to determine whether or not a person is present in the trailer when a shift range is in a parking range, and to ignore a shift range switching operation by a driver when the shift range switching operation is performed while a person is present in the trailer;
    wherein the trailer is provided with a toilet room and a detection unit that detects the presence or absence of a person in the toilet room,
    the control device is configured to acquire a detection result of the detection unit; and
    when it is determined that a user is in the toilet room, the shift range is kept in the parking range.

2. The control device according to claim 1, wherein
    the control device is configured to inform the driver of the presence of a person in the trailer by means of an informing device when the switching operation is ignored.

3. A control method for controlling a vehicle towing a trailer, the control method comprising the steps of:
    determining whether or not a person is present in the trailer when a shift range is in a parking range; and
    ignoring a shift range switching operation by a driver when the shift range switching operation is performed while a person is present in the trailer;
    wherein the trailer is provided with a toilet room and the control method further comprises the steps of detecting the presence or absence of a person in the toilet room, and
    when it is determined that a user is in the toilet room, keeping the shift range in the parking range.

* * * * *